United States Patent Office 2,796,406
Patented June 18, 1957

2,796,406

LUBRICATING COMPOSITIONS

Lyman E. Lorensen, Berkeley, Calif., assignor to Shell Development Company, New York, N. Y., a corporation of Delaware No Drawing. Application December 13, 1954,
Serial No. 475,013

13 Claims. (Cl. 252—49.6)

This invention relates to lubricants, and more particularly to new and improved lubricating compositions containing poly-functional additives which possess particularly pour point depressing and viscosity index improving properties.

Many lubricating oils, because of the nature of their source and/or methods of refining, contain greater or lesser amounts of wax. Lubricating oils of this type are less desirable for many types of operations, particularly under cold operating conditions, such as those encountered in cold climates, this because they readily congeal. In order to overcome this defect in wax-containing lubricating oils, pour point depressants and viscosity index improvers have to be employed with such oils. Among the best known additives for this purpose are the polymeric esters of the acrylic (including methacrylic) acid series, and mixtures of these polymeric materials with other types of polymers, such as polymerized olefins, including polyisobutylene, polystyrene, polyindene, polyisoprene, and the like.

Although the above-mentioned polymeric materials can effectively reduce the pour point and improve the viscosity index of oils, impart certain undesirable properties because: (a) they are corrosive, (b) they have the tendency to form emulsions when water or steam is present, and (c) they possess the tendency to break down at elevated temperatures.

It has now been discovered that the above undesirable effects of polymeric pour point depressants or lubricating oil can be overcome by addition to lubricating oil compositions of from about 0.01% to about 5%, preferably from about 0.05% to about 2% of an oil-soluble linear polymeric silicon ester or polysilicate which has the formula:

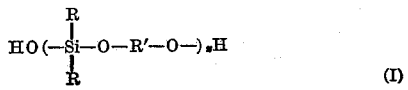

(I)

wherein at least one or both R's are, or contain, long chain hydrocarbyl radicals such as long chain alkyl or alkylene radicals of at least 8 and preferably more than 12 carbon atoms; R' is a hydrocarbyl radical, preferably an alkylene or polymethylene radical of from 2 to 10 carbon atoms and preferably from 2 to 4 carbon atoms; and $x$ represents the number of units in the polymeric compound. These polymeric compounds should have a molecular weight of from about 3000 to about 500,000 or higher and preferably between about 5000 and about 200,000 (as determined by the light scattering method).

These linear polymeric silicon esters can be prepared by reacting a dihydric compound with a dihydrocarbon dihalosilane $R_2SiX_2$ or with silicon compounds of the type $R_2Si(OR)_2$ or $R_2Si(O-COR)_2$ (II) (wherein the R's are as defined in Formula I), with or without the aid of a catalyst or acid acceptor. These catalysts (if used) can be of any type which promote the reaction. They can be acidic or basic, such as sulfuric acid or a metallic hydroxide, such as potassium hydroxide. Organic nitrogen base compounds, e. g., trialkyl amines, illustrated by triethylamines, as well as heterocyclic nitrogen bases such as pyridine, can be used as the acid acceptors. The catalyst or acid acceptor can be used in amounts of from about 0.001% to about 1%. With respect to the acid acceptor the amount used should be sufficient to take care of the acid formed.

In the silicon-containing compound defined above as $R_2SiX_2$, the X represents any halogen atom, i. e., chlorine, bromine, fluorine or iodine. Also, in the above Formula II, at least one of the R's bonded directly to the silicon atom should be a long chain alkyl radical such as octyl, dodecyl, octadecyl, oleyl radical, while the other R's can be hydrogen or short hydrocarbyl radicals of not more than 8 carbon atoms, such as methyl, ethyl, propyl, amyl, allyl, phenyl, tolyl or benzyl.

The polyhydric compounds used in the production of the linear polyesters should be dihydric compounds and include dihydroxyalkanes, dihydroxycycloalkanes and dihydroxyalkenes such as ethylene glycol, propylene glycol, butylene glycol, 1,4-dihydroxybutene-2, methyl pentanediol, as well as ether oxygen containing dihydric compounds such as diethylene glycol, trimethylene glycol, triethylene glycol, dipropylene glycol, methoxymethyl dimethylpentanediol, ethoxymethyl diethylpentanediol, etc. The proportions of the two reactants can be varied, however, it is preferred that they be reacted in chemically equivalent amounts that is one mol of the silicon compound should be reacted with one mol of the polyhydric compound. The temperature of the reaction can be varied widely depending upon the reactants, catalysts used and the like and can vary from less than 100° C. to above 350° C. However, the preferred temperature range for reactions under discussion is between 150° and 250° C.

The following examples illustrate this invention.

EXAMPLE I

About 20 grams of octadecylphenyldichlorosilane was refluxed for about 2 hours with about 19 grams of acetic anhydride in the presence of about 4 drops of 1:1 sulfuric acid. The temperature was slowly raised to about 190°, removing acetyl chloride and excess acetic anhydride. Thereafter about 6–7 drops of 50% KOH solution was added together with about 3.5 grams of trimethylene glycol while stirring and the mixture heated to about 200° C. The acetic acid formed was removed and the residue was dissolved in 50 ml. of benzene, filtered and to the filtrate about 400 ml. of acetone was added. The white polymer which precipitated was filtered off. The reaction product namely, the silicon polyester of octadecylphenyldichlorosilane/trimethylene glycol was dried at 200 mm. pressure and had a molecular weight as determined by light scattering of about 2900 and had 6.7 units per molecule and had the formula

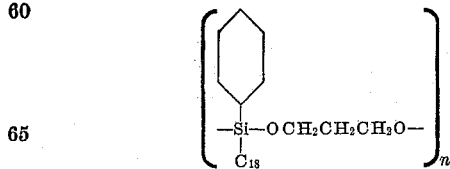

This polymer when added in a minor amount to an oil, functioned as a pour point and VI improving agent.

EXAMPLE II

Following the procedure of Example I a silicon polyester was prepared using octadecylphenyldichlorosilane and butanediol-1,4. The polymeric silicon ester had a molecular weight of around 3300 as determined by the light scattering method and had good oil solubility and

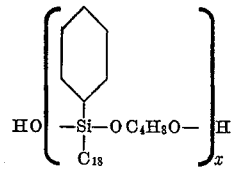

had the formula The polymer had good pour point depressing properties.

EXAMPLE III

About 35.3 grams of octadecyl dichlorosilane ($C_{18}H_{37}SiHCl_2$) and 29.4 ml. of acetic anhydride were refluxed for about 2 hours in the presence of 1:1 sulfuric acid (3 drops). The acetyl chloride and excess acetic anhydride were removed and about 6.1 grams of trimethylene glycol added and the mixture heated with stirring at 150–180° pot temperature. The polymeric silicon ester was purified as in Example I. The polymer functioned as a pour point depressant when added to oil.

EXAMPLE IV

About 27 grams of dodecyl dichlorosilane was reacted with about 5 grams of ethylene glycol in about 100 ml. of pyridine at reflux temperature. To the reaction product about 75 ml. of toluene was added and the product was filtered and stripped to a kettle temperature of 192° C. at 2 mm. pressure. The polymeric ester had a molecular weight of around 7550 as determined by the light scattering method and had the formula

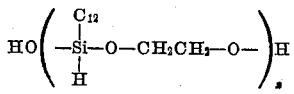

This polymer is a good VI and pour point depressing agent.

EXAMPLE V

About 25 grams of octadecyl dodecyl dichlorosilane was reacted with 27 ml. of acetic anhydride in the presence of 1:1 sulfuric acid as described in Example I. To this product was added about 3.1 grams of trimethylene glycol and the mixture was heated for about 4 hours. About 50 ml. of benzene was added and filtered hot and precipitated in 300 cc. of acetone. The final product, having the formula listed below, was filtered and dried.

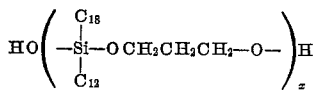

This polymer has good pour point depressing properties.

In addition to the above specific examples the following silicon polyesters can be prepared by the methods described in the above examples. Such polymeric silicon esters include the esters of ethylene glycol, propylene glycol, 1,4-dihydroxybutene-2, diethylene glycol, dipropylene glycol with either alkyl diacetoxysilanes such as mono- or di-decyl, dodecyl, tetradecyl, octadecyl; phenyl dodecyl diacetoxy silanes or with the corresponding dihalosilanes such as the corresponding organo dichloro or dibromo silanes.

Polymeric silicon esters of the type described above can be replaced wholly or in part by polymeric silicates and/or polymeric acid silicates. Polymeric silicates can be prepared by reacting dihydric compounds of the type used to form the polymeric silicon esters described above with dihydrocarboxydihalosilanes or with ortho silicates. The dihydrocarboxy dihalosilanes include dialkoxydichlorosilanes such as dihexadecyloxydidodecyldichlorosilane, dioctadecyldichlorosilane, phenoxyoctadecyldichlorosilane, benzyl dodecyldichlorosilane and the like. The ortho silicates which can be used include tetrahexyl silicate, dihexyldidodecyl silicate, tetradodecyl silicate, tetraocta-decyl silicate, diphenyldioctadecyl silicate and the like.

The above polymeric compounds or mixtures thereof can be added to various base oils in amounts of from about 0.001% to 10% and preferably between 0.1% and 5% by weight in order to improve the pour point or viscosity index properties of the base oil, or oil composition.

The base can be any natural or synthetic material having lubricating properties. Thus, the base may be a hydrocarbon oil obtained from a paraffinic, naphthenic, Mid-Continent of Coastal stock and/or mixtures thereof. The viscosity of these oils may vary over a wide range such as from 100 SUS at 100° F. to 100 SUS at 210° F. The hydrocarbon oils may be blended with fixed oils such as castor oil, lard oil and the like and/or with synthetic lubricants such as polymerized olefins, copolymers of alkylene glycols and alkylene oxides, organic esters, e. g., 2-ethyl hexyl sebacate, dioctyl phthalate, trioctyl phosphate; polymeric tetrahydrofuran, polyalkyl silicone polymers, e. g., dimethyl silicone polymers and the like. In addition, the base can be a fuel oil, etc.

The pour point effect which additives of this invention possess is evident from the data presented below:

Table I

Base: A—East Texas 250 neutral, pour point +20
B—Refined white oil +2% wax, pour point +70

| Additive | Amount, percent wt. | ASTM (D-97-47) Pour Point, ° F. | |
|---|---|---|---|
| | | Base | |
| | | A | B |
| Example I | 0.5 | | −55 |
| Example II | 0.5 | | −35 |
| Example III | 0.5 | | −15 |
| Example IV | 0.5 | −15 | |
| Example V | 0.5 | | −55 |

Compositions of this invention can be modified by addition thereto of minor amounts (0.01–2%) of blooming agents, corrosion inhibitors, oiliness agents, anti-wear agents solubilizers and the like. Among such materials can be included organic nitrites such as diisopropylammonium nitrite or dicyclohexylammonium nitrite: organic phosphites, phosphates and phosphonates such as trichloroethyl phosphite, tricresyl phosphate, dilorol phosphate, phosphorus sulfide reaction products such as $P_2S_5$-terpene reaction products, metal organic phosphates, e. g., Zn dimethylcyclohexyl phosphate, organic sulfides, e. g., wax disulfide, ethylene bistolyl sulfide: amine, e. g., octadecylamine and the like.

I claim as my invention:

1. A mineral lubricating oil composition comprising a major amount of waxy mineral oil and a minor amount, sufficient to effectively decrease the pour point of said oil, of an oil-soluble linear polymer having the formula

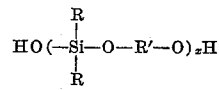

wherein at least one R is a long hydrocarbyl radical of at least 8 carbon atoms, R' is an alkylene radical of from 2 to 10 carbon atoms, and x is the number of units in the polymer, said polymer having a molecular weight of at least about 3000.

2. A mineral oil lubricating oil composition comprising a major amount of a waxy mineral oil and a minor amount, sufficient to effectively decrease the pour point of said oil, of an oil-soluble linear polymer having the formula

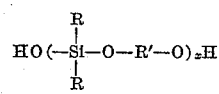

wherein at least one R is an alkyl radical of at least 12 carbon atoms, R' is an alkylene radical of from 2 to 4 carbon atoms, and $x$ is the number of units in the polymer, said polymer having a molecular weight of at least about 3000.

3. A mineral lubricating oil composition comprising a major amount of a waxy mineral oil containing from about 0.01% to about 5% of an oil-soluble linear polymer having the formula

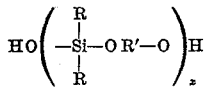

wherein one R is an alkyl radical of at least 12 carbon atoms and the other R can be selected from the group consisting of hydrogen, alkyl, alkaryl and aralkyl radicals of less than 12 carbon atoms, $x$ is the number of units in the polymer, R' is an alkylene radical of 2 to 4 carbon atoms, said polymer having a molecular weight of at least about 3000.

4. A mineral lubricating oil composition comprising a major amount of a waxy mineral oil containing from about 0.01% to about 5% of an oil-soluble linear polymer having the formula

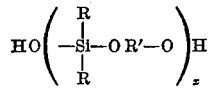

wherein one R is an alkyl radical of at least 12 carbon atoms and the other R is an aryl radical, R' is an alkylene radical of 2 to 4 carbon atoms, $x$ is the number of units in the polymer, said polymer having a molecular weight of at least about 3000.

5. A mineral lubricating oil composition comprising a major amount of a waxy mineral oil containing from about 0.01% to about 5% of an oil-soluble linear polymer having the formula

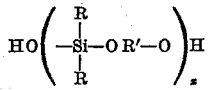

wherein the R's are alkyl radicals of at least 12 carbon atoms, $x$ is the number of units in the polymer, R' is an alkylene radical of 2 to 4 carbon atoms, said polymer having a molecular weight of at least about 3000.

6. A mineral lubricating oil composition comprising a major amount of a waxy mineral oil containing from about 0.01% to about 5% of an oil-soluble linear polymer having the formula

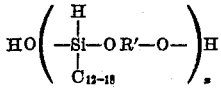

wherein R' is an alkylene radical of from 2 to 4 carbon atoms, $x$ is the number of units in the polymer, said polymer having a molecular weight of at least 3000.

7. A mineral lubricating oil composition comprising a major amount of a waxy mineral oil containing from about 0.01% to about 5% of an oil-soluble linear polymer having the formula

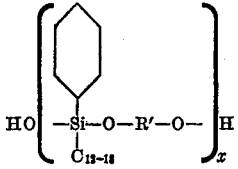

wherein R' is an alkylene radical of from 2 to 4 carbon atoms, $x$ is the number of units in the polymer, said polymer having a molecular weight of at least 3000.

8. A mineral lubricating oil composition comprising a major amount of a waxy mineral oil containing from about 0.01% to about 5% of an oil-soluble linear polymer having the formula

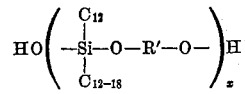

wherein R' is an alkylene radical of from 2 to 4 carbon atoms $x$ is the number of units in the polymer, said polymer having a molecular weight of at least 3000.

9. A mineral lubricating oil composition comprising a major amount of a waxy mineral oil containing from 0.01% to 5% of an oil-soluble linear polymeric compound having recurring units

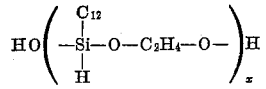

$x$ is the number of units in the polymer, said polymer having a molecular weight above 3000.

10. A mineral lubricating oil composition comprising a major amount of a waxy mineral oil containing from 0.01% to 5% of an oil-soluble linear polymeric compound having the formula

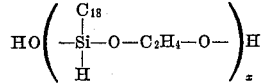

$x$ is the number of units in the polymer, said polymer having a molecular weight above 3000.

11. A mineral lubricating oil composition comprising a major amount of a waxy mineral oil containing from 0.01% to 5% of an oil-soluble linear polymeric compound having the formula

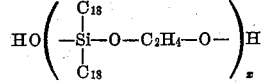

$x$ is the number of units in the polymer, said polymer having a molecular weight above 3000.

12. A mineral lubricating oil composition comprising a major amount of a waxy mineral oil containing from 0.01% to 5% of an oil-soluble linear polymeric compound having the formula

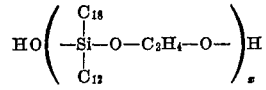

$x$ is the number of units in the polymer, said polymer having a molecular weight above 3000.

13. A mineral lubricating oil composition comprising a major amount of a waxy mineral oil containing from 0.01% to 5% of an oil-soluble linear polymeric compound having the formula

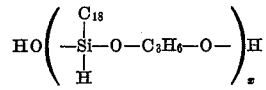

$x$ is the number of units in the polymer, said polymer having a molecular weight above 3000.

References Cited in the file of this patent
UNITED STATES PATENTS

| | | |
|---|---|---|
| 2,386,793 | Hanford | Oct. 16, 1945 |
| 2,630,446 | Gresham | Mar. 3, 1953 |
| 2,756,212 | Hotten | July 24, 1956 |